United States Patent

Scherping et al.

[11] Patent Number: 5,855,671
[45] Date of Patent: Jan. 5, 1999

[54] SALTING DEVICE

[75] Inventors: Virgil J. Scherping, Winsted; George H. Schwinghammer, Hutchinson; Gary L. Starkson, Lester Prairie, all of Minn.

[73] Assignee: Walker Stainless Equipment, Company, Inc., New Lisbon, Wis.

[21] Appl. No.: 822,599

[22] Filed: Mar. 20, 1997

Related U.S. Application Data

[62] Division of Ser. No. 567,087, Dec. 4, 1995, Pat. No. 5,704,280.

[51] Int. Cl.$^6$ .................................................. A01J 25/00
[52] U.S. Cl. ........................... 118/13; 118/24; 118/308; 99/494; 99/452; 222/630; 222/637
[58] Field of Search .............................. 118/13, 24, 308; 99/494, 452; 222/630, 637; 426/36, 289

[56] References Cited

U.S. PATENT DOCUMENTS

| | | |
|---|---|---|
| 578,053 | 3/1897 | Dornfeld . |
| 794,421 | 7/1905 | McKinnon . |
| 1,499,026 | 6/1924 | Naulin . |
| 2,774,140 | 12/1956 | Nessler et al. . |
| 3,490,751 | 1/1970 | Thomson . |
| 3,693,840 | 9/1972 | Starr ........................................ 406/129 |
| 3,707,769 | 1/1973 | Syrjanen et al. . |
| 3,750,286 | 8/1973 | Whelan .................... 99/455 |
| 4,206,880 | 6/1980 | Stanton . |
| 4,300,446 | 11/1981 | Hazen ...................... 99/494 |
| 4,309,941 | 1/1982 | Brockwell . |
| 4,321,860 | 3/1982 | Hazen . |
| 4,321,861 | 3/1982 | Hain et al. . |
| 4,448,116 | 5/1984 | Muzzarelli . |
| 4,510,856 | 4/1985 | Hammond et al. . |
| 4,538,510 | 9/1985 | Latimer et al. . |
| 4,879,946 | 11/1989 | Blodgett et al. . |
| 4,964,334 | 10/1990 | Jay . |
| 4,989,504 | 2/1991 | Jay . |

FOREIGN PATENT DOCUMENTS 2046569  10/1980  United Kingdom .

*Primary Examiner*—Laura Edwards
*Attorney, Agent, or Firm*—Dorsey & Whitney LLP

[57] ABSTRACT

An enclosed food processing device is provided having one or more conveyor belts and vertical agitators positioned above the belt. The agitators have forward and backward prongs that stir the food being processed without causing physical damage to it. The food enters the device through an inlet and is evenly distributed across a draining screen by an inlet deflector plate, which is adjustable to account for the different rates at which the food may flow into the device. Ramps are positioned under the device to collect liquid drained from the food, and the ramps have independent segments that separate the liquid based on the stage of the process at which it is drained from the food. A salting apparatus is provided for conveying salt to the food to be processed. The salt is dispensed in proportion to the amount of food to be salted. Salt is moved from a salt hopper into a chamber by a rotating dispensing wheel. The salting apparatus has a pump that moves a fluid, such as filtered air, through a Venturi pickup tee, where it creates a partial vacuum that pulls salt into the airstream from the chamber. The salt then is pushed through stationary salt distribution tubes and applied to the food to be salted.

26 Claims, 15 Drawing Sheets

Fig. 2

| Fig. 2A | Fig. 2B | Fig. 2C |

Fig. 3

| Fig. 2A | Fig. 2B | Fig. 2C |

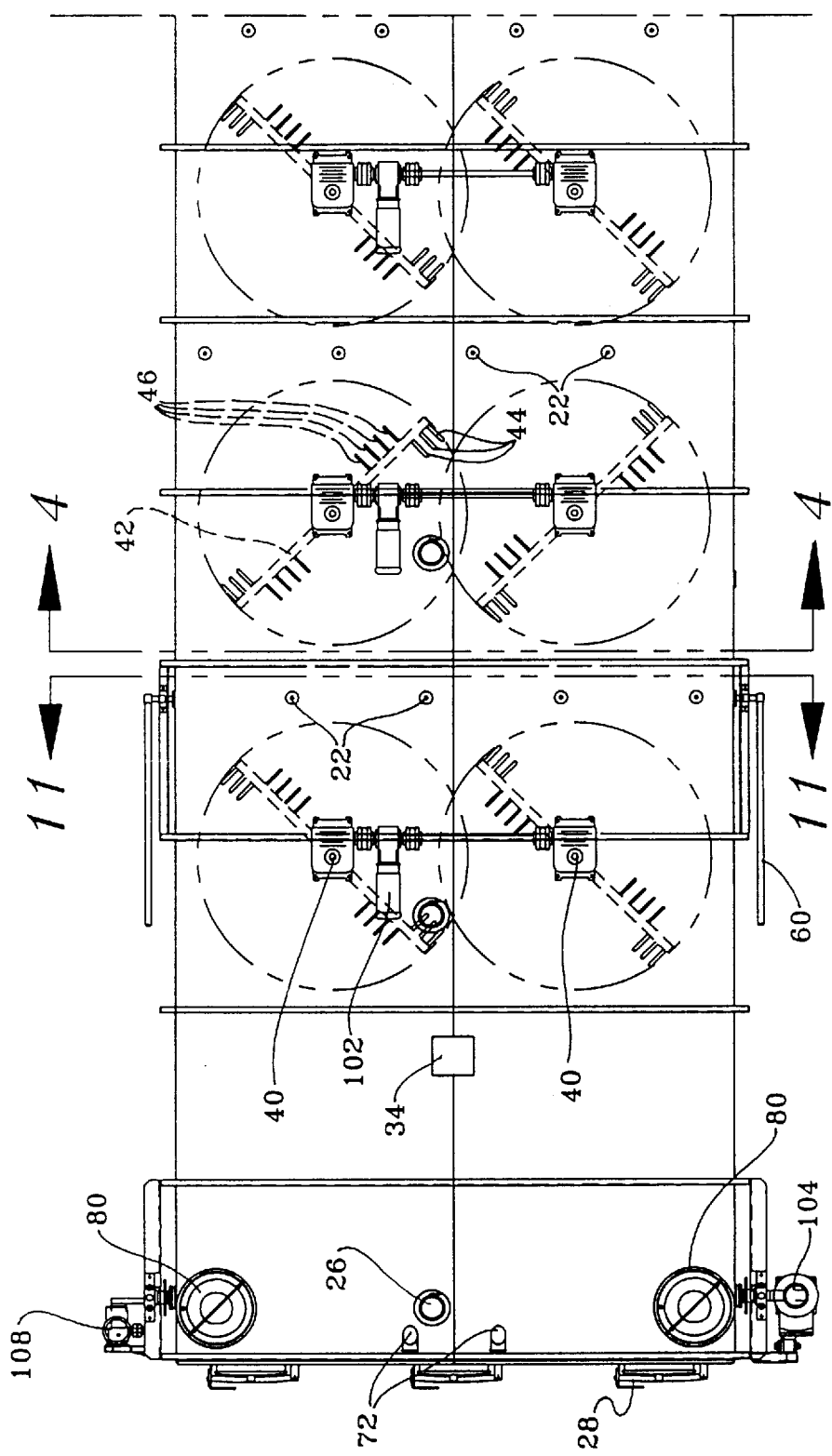

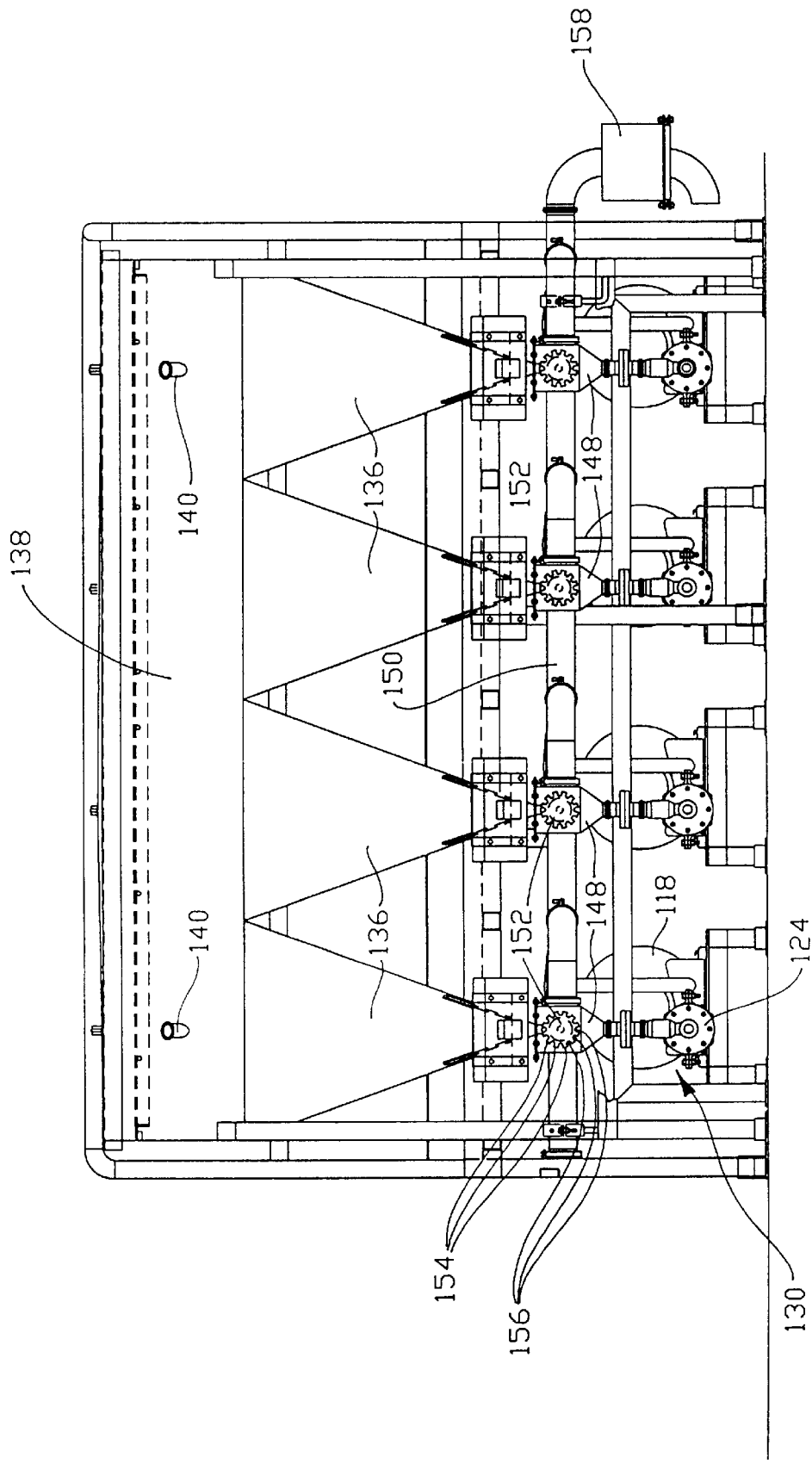

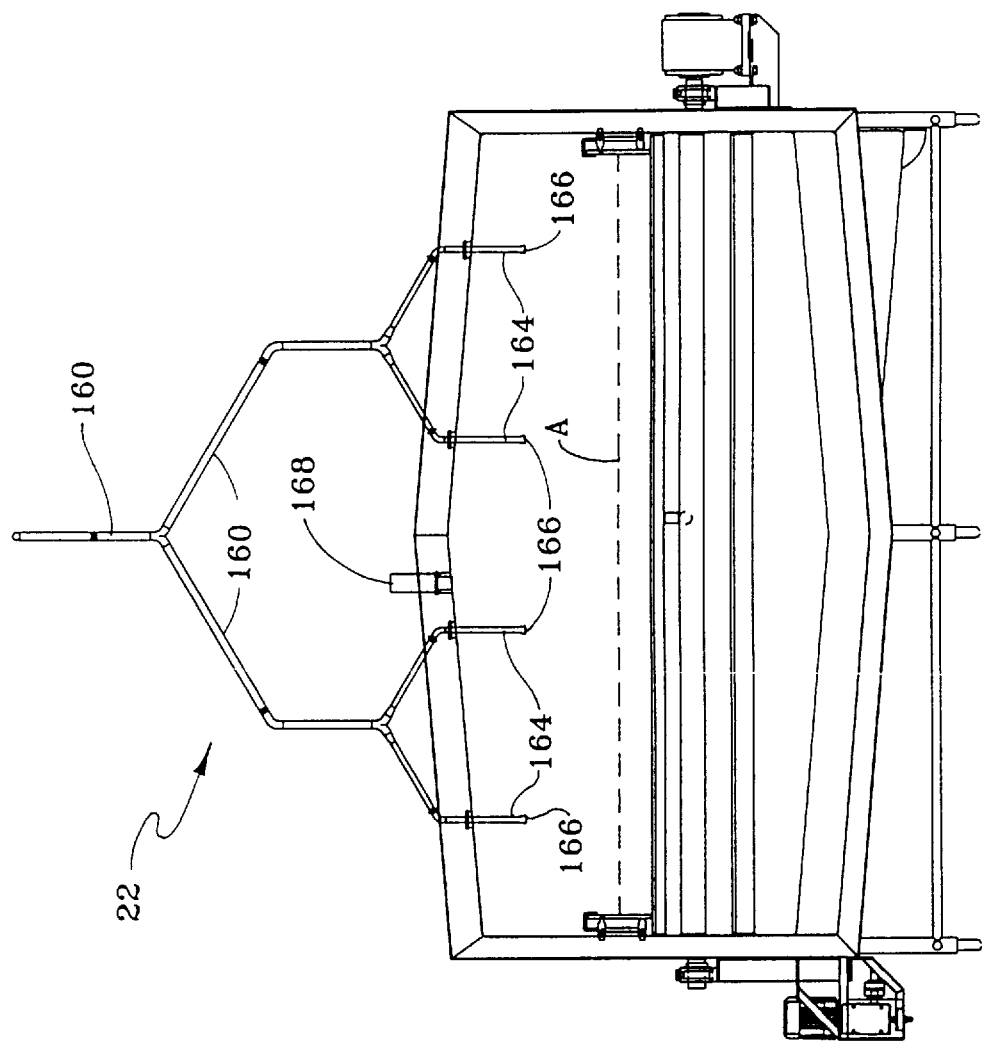

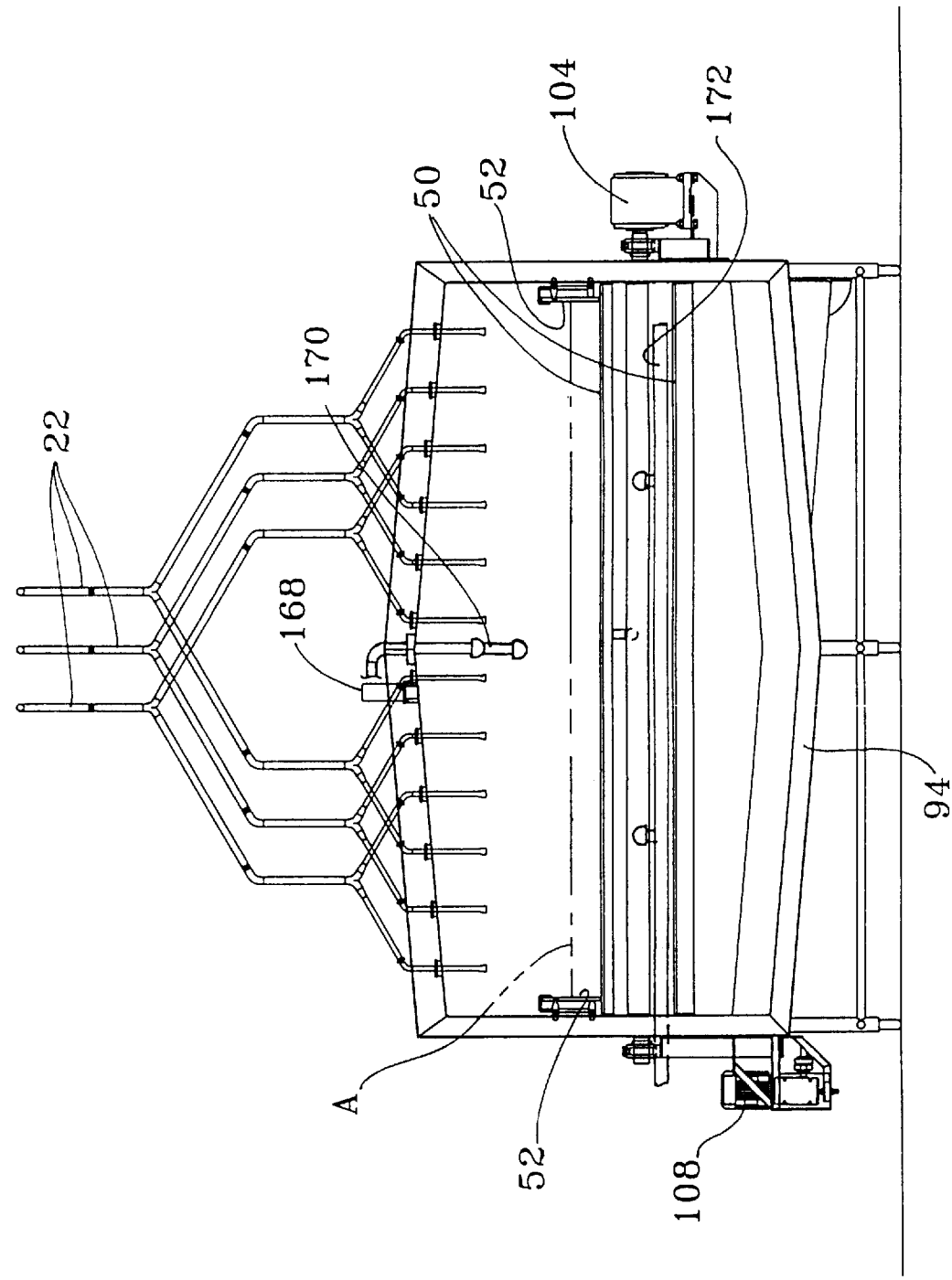

SALTING DEVICE

The present application is a division of U.S. Ser. No. 08/567,087, filed Dec. 4, 1995 now U.S. Pat No. 5,704,280.

TECHNICAL FIELD

The present invention relates generally to the field of food processing equipment. More particularly, the present invention relates to a device for processing food products, such as cheeses. The device comprises a horizontal conveyor belt over which is mounted a plurality of generally vertical agitators, thus permitting uniform mixing of the food with minimum physical damage to the food. Salt is dispensed in proportion to the amount of food being processed, evenly distributed by staggered stationary salt nozzles over the food being processed, and mixed into the food by the agitators.

BACKGROUND OF THE INVENTION

The present invention is suitable for producing a variety of cheeses (designated herein as "stirred curd" cheeses), including American style cheeses, such as current manufacture, cheddar, Colby, American, and other washed curd varieties; Italian style cheeses, such as mozzarella, pizza cheese, Parmesan, Romano, and provolone cheeses; semi-soft cheeses, such as brick, Edam, Gouda, Muenster, Monterey Jack, and pepper jack; and Swiss varieties, such as traditional Swiss, baby Swiss, and Jarlsberg cheeses. It is suitable for salting any type of food product, including these and other types of cheeses. Cheesemakers have strong financial incentives to ensure that these cheeses are made up of uniform sized curds and have moisture levels that fall within specific ranges prescribed by government and industry bodies. In the United States, the United States Department of Agriculture (U.S.D.A.) prescribes the ranges for each type of cheese. The cheese moisture level is greatly affected by salt content and distribution.

For about the last twenty-five years, stirred curd cheeses have been produced in large, open, tub-like curd tables. Curd tables have vertical agitators mounted on an assembly above the table. As the assembly moves back and forth above the table, the cheese curds are mixed. The vertical agitators ensure that the curds, when mixed, are of uniform size. Thomson, U.S. Pat. No. 3,490,751, issued Jan. 20, 1970; Naulin, U.S. Pat. No. 1,499,026, issued Jun. 24, 1924; and McKinnon, U.S. Pat. No. 794,421, issued Jul. 11, 1905, disclose assemblies that stir cheese curds.

Curd tables have serious disadvantages, however. First, making stirred curd cheeses on a curd table is a labor-intensive process. The cheesemaker must start with an empty table, and then fill it with curds and whey. As the curds are mixed and processed, salt must be added to the curds by hand at the proper point in the processing. After mixing and processing the curds, the agitator attachments are removed and replaced with attachments that scoop the product from the table. Because the assembly can remove the product from the curd table only in small scoops, and cannot remove it all at once, the process of removing the curds is time consuming and labor-intensive. To make matters worse, because the assembly is not able to remove curds from the corners and edges of the curd table, after the assembly has been used to remove most of the curds the cheesemaker manually must remove the product that remains in the corners and edges of the curd table. Further, because some curds must sit for longer periods of time than others during the removal process, it is difficult to ensure that moisture levels are uniform in all of the curds. Specifically, because moisture is lost as the curds sit, the curds that are removed earlier will have a higher moisture content than those that are removed later.

In addition, the sequential nature of cheese curd processing on a curd table makes it difficult to obtain uniform salt concentrations and consistent levels of acid development. Bacteria are added to obtain the proper acid levels in the cheese; the acid develops at a rate that is a function of the amount of bacteria added and the time the bacteria are allowed to work. When the acid level is within the desired range, users of the curd table must spread salt over the curds manually. Because the salt is distributed by hand, uniform salt dispersion is inherently difficult; and because it takes several minutes to distribute salt over the curds, curds that are salted first are salted at an earlier stage of acid development than are those that are salted later. In addition, because it takes the cheesemaker several minutes to apply salt to the curds, the salt is not applied at a single point in the process. The result of these difficulties is that the acid development and moisture content of the curds are not uniform. Finally, this salting process also is labor-intensive, and inconsistent salt concentrations result because the quantity of cheese delivered from the vat to the curd table may vary from batch to batch.

Curd tables have other disadvantages, as well. Because the tables are open, the curds are exposed to airborne contaminants, the rate at which process heat is lost cannot be controlled, and moisture is lost into the atmosphere. Furthermore, the agitator assemblies are complex and require significant maintenance. In addition, curd tables drain the whey from the curds by means of a mesh screen at the bottom of the table. As the curds are mixed, however, they are pushed across the screen repeatedly, which effects a grating action on the curds. This grating action causes small particles, called curd fines, to be lost from the curds and pass through the screen, thus reducing yields.

When compared to curd tables, conveyor belt systems save labor. The belt systems that currently are in use were developed approximately fifteen years ago. They use horizontal agitators, which have sharp prongs that physically alter the curds by knitting them together and then grinding them up. Latimer et al., U.S. Pat. No. 4,538,510, issued Sep. 3, 1985, and Brockwell, U.S. Pat. No. 4,309,941, issued Jan. 12, 1982, disclose conveyor belt systems with horizontal agitators. Although systems with horizontal agitators are suitable for some types of cheeses, they are not suitable for processing stirred curd cheeses because they physically damage the cheese curds and cannot produce uniform sized cheese curds.

Horizontal agitator systems also have several inherent processing disadvantages. When the curds and whey are dispensed onto the conveyor belt, the mixture is of varying depths or thicknesses. Horizontal agitators are not able to level the mixture across the width of the belt, so mixing is not uniform. Furthermore, because the horizontal agitators tend to grind the cheese, they produce curd fines, thus reducing yields and causing profits to be lost. Also, because horizontal conveyor systems produce curds of different sizes, moisture content and salt penetration varies from curd to curd.

There also are disadvantages to the oscillating boom salting apparatuses currently used with conveyor belt systems. First, oscillating booms consist of many moving parts, and thus are expensive to manufacture and to maintain. More important for cheese processing purposes is that the booms apply more salt to the food at each end of the oscillation cycle, and thus do not apply salt to the curds in a uniform manner.

These salting problems are exacerbated by the use of the horizontal agitators with conveyor belts. Because the horizontal agitators cannot level the height of the curds across the width of the belt, the salt concentration varies based on the height of the curd mass where the salt is applied. Furthermore, horizontal agitators are unable to mix the salt uniformly across the width of the belt, and instead tend only to push the salt in the same straight-line direction in which the food already is travelling on the conveyor belt. In addition, horizontal agitators spin in a single location, so they are not effective for stirring the food.

Horizontal agitator systems also have sanitation problems. The bearings used with horizontal agitators are subject to large loads, and the bearings wear out and begin to leak. Conversely, cleaning materials may leak into and damage the bearings. Significant maintenance is required to detect and correct leakage problems as soon as they occur.

Neither the curd tables nor the conveyor belt systems provides a mechanism for monitoring the moisture level of the cheese curds. The moisture levels therefore cannot be measured until the next day. Because the moisture levels in fully processed cheese cannot be adjusted, if the moisture levels fall outside prescribed parameters, the entire previous day's production of cheese must be disposed of at less than fair market value for that type of cheese.

There is an unmet need for a food processing device that allows processing of large quantities of stirred curd cheeses while maintaining the physical consistency and integrity of the curds, and at the same time solves the timing problems associated with curd tables and reduces the amount of labor required to process the cheese curds. It further would be desirable if the food processing device had a mechanized salting apparatus that did not have moving parts, but that did spread the salt evenly over the food being processed and in proportion to the amount of food being processed.

SUMMARY OF THE INVENTION

The present invention is directed to a food processing device. The invention comprises an elongated housing. In the preferred embodiment, the housing is enclosed. A curd and whey inlet is positioned at the first end (the upstream end) of the housing, and an inlet deflector plate is positioned next to the curd and whey inlet. The distance between the curd and whey inlet and the inlet deflector plate may be adjusted so as to be proportioned to the rate at which the curds and whey flow through the curd and whey inlet.

A mixture of curds and whey from the manufacturing vats enters the invention through the curd and whey inlet, and is deflected by the inlet deflector plate and deposited onto a draining screen. In the preferred embodiment, the draining screen is a wedge wire draining screen. A suitable wedge wire draining screen may be purchased from Johnson Filtration Systems of St. Paul. In the preferred embodiment, the angle of the draining screen is adjustable with respect to the curd and whey inlet. As the mixture slides down the draining screen and onto the conveyor belt, a substantial portion of whey is drained from the curds and is collected.

A presalt tube apparatus is positioned near the entrance of the device to apply an initial salting to the curds. This initial salting, also called a "presalt," is applied while the temperature of the curds is high to encourage the formation of films, which help keep the curds from knitting together. Additional salt tube apparatuses are mounted toward the second end (the downstream end) of the housing to salt the curds more extensively.

The conveyor belt allows whey to drain from the curds without producing cheese fines. In the preferred embodiment, the belt is made of interconnected segments between which liquid may flow. Such a belt may be purchased from Intralox, Inc. of Harahan, La., or any other suitable supplier. Inclined surfaces are positioned under the conveyor belt to drain whey toward collecting receptacles. The inclined surfaces are positioned independently so that whey drained from nonsalted and presalted curds is collected separately from whey drained from the curds after they have received their more extensive salting later in the processing.

Agitators are positioned above the conveyor belt, along the length of the belt, to agitate the curds. In the preferred embodiment, each agitator has an axis of rotation that is generally perpendicular to the upper surface of the material being processed. Because the curds cool as they move down the belt, they are less likely to knit together toward the downstream end of the device. They thus need more agitation toward the upstream end of the device, and less agitation toward the downstream end of the device. Accordingly, in the preferred embodiment, the agitators are spaced farther apart toward the device's downstream end than toward its upstream end, thus permitting the use of fewer agitators and agitator drive means along the length of the device. However, the agitators may be positioned in any manner suitable to the application. For example, it may be desirable to position the agitators so that they agitate an area that overlaps the area agitated by adjacent upstream or downstream agitators.

Any number of agitators also may be used across the width of the belt. In the preferred embodiment, the agitators are positioned side by side, in pairs, across the width of the belt, and the area agitated by each agitator overlaps the area agitated by its adjacent paired agitator. The paired agitators are spaced along the full length of the conveyor belt, as has been described.

Each agitator may rotate in either the same or in the opposite direction from that of the agitators adjacent to it across the width of the belt and along the length of the belt. In the preferred embodiment, the agitators in each pair across the width of the belt rotate in opposite directions.

It is contemplated that many types of agitators would work with the present invention. For example, a horizontal agitator with blunt attachments that tended to scoop and stir the curds, instead of the sharp finger-like attachments currently used with horizontal agitators, would produce stirred curd cheeses. Similarly, agitators with an axis of rotation that is angled into the curds, rather than strictly perpendicular to the belt, would be within the scope of the present invention. Such agitators could be mounted either to the sides or top of the food processing device. It is contemplated that other agitator configurations also may be suitable to practice the present invention, so long as the agitators stir the curds without physically damaging them. In the preferred embodiment, however, each agitators has an axis of rotation that is oriented generally vertically with respect to the plane of the upper surface of the material being processed, and most preferably the axis of rotation is perpendicular to the upper surface of the material being processed. This embodiment is preferred because it allows effective stirring, and thus produces the most uniform mixing of the curds. Any agitator with a generally vertical axis of rotation is suitable to practice the invention, regardless of the agitator's configuration and regardless of whether it has a vertical member. In the preferred embodiment, each vertical agitator comprises a horizontal member that is held in place above the curds by a fixed axis vertical support member attached to drive means.

Each generally vertical agitator may have any suitable attachments that stir the curds without physically damaging them. In the preferred embodiment, the attachments comprise forward and rearward prongs. The prongs revolve about the agitator's generally vertical axis of rotation. As used herein, "revolve" means either "rotate" or "revolve." The forward prongs curve as they approach the belt so that the bottom end of each forward prong points in the direction that the prong is travelling, thus enabling the prong to scoop curds from the belt surface without physically damaging them. As depicted in the figures submitted herewith, the forward prongs are made of rods, and thus have circular cross-sections. In the preferred embodiment, the forward prong has a rectangular cross-section, with the wide portion of the prong being parallel to the belt. A suitable dimension for the cross-section of this forward prong is roughly two inches by one-half inch. The tip of the forward prong is rounded so as not to damage the curds. The rearward prongs also may have any suitably shaped cross-section, but a circular cross-section is preferred. The rearward prongs extend into the curds, thus stirring them and breaking up clumps as the vertical agitator rotates.

The forward and rearward prongs may be arranged in any manner and number. In the preferred embodiment, the rearward prongs are closer to the agitator's axis of rotation than are the forward prongs. It may be desirable in some applications, however, to alternate or otherwise arrange the forward and rearward prongs from the agitator's axis of rotation outward to the edge of the agitator's reach. The prongs also may be provided in any number, as long as there is at least one prong, either forward or rearward, on each agitator. In the preferred embodiment, more than one grouping of prongs will be operably connected to the agitator's axis of rotation, and each grouping will comprise one forward prong and more than one rearward prong.

Any suitable drive means may be used for the agitators. In addition, any desired ratio of drive means to agitators may be used; the ratio may vary anywhere from having all agitators driven by a single drive means to having each agitator driven by its own dedicated drive means. In the preferred embodiment, multiple drive means are used. More specifically, the device uses one drive means for each pair of vertical agitators. Also in the preferred embodiment, a sealed, raised lip is placed on each generally vertical shaft to prevent fluids from leaking from the bearing or drive means into the food stream.

In a preferred embodiment, a temperature sensor detects the temperature of the curds. This temperature sensor may be located anywhere, but preferably is located midway along the length of the housing. Also in a preferred embodiment, ventilation ducts are attached to the housing. In the most preferred embodiment, the temperature sensor is operably connected to the ventilation ducts, thus controlling the amount of airflow over the curds in accordance with the temperature of the curds, and thereby allowing the curds to be processed at the desired temperature.

In addition, to assist in maintaining the proper moisture content of the curds, a moisture sensing device may be provided. The moisture sensing device informs the cheesemaker whether the curds' moisture levels are within proper parameters. In the preferred embodiment, the moisture sensing device is positioned toward the downstream end of the device.

Various cleaning nozzles are located along the length of the belt. In a preferred embodiment, some take the form of spray balls, which are particularly suited to cleaning the inside of the housing, while others take the form of spray bars, which are particularly suited for cleaning the conveyor belts.

Salt is dispensed into the tube apparatuses by a salt dispenser. The salt dispenser and tube apparatuses may be used to apply salt to any type of food being processed, and to any type of cheese being processed, whether of the stirred curd or milled varieties. It is to be noted that the salt dispenser and salt tube apparatuses may be used independently of the conveyor, the agitators, or both, but that there is a synergistic effect between the systems.

In the preferred embodiment, a quantity sensor measures the quantity of curds on the belt. The quantity sensor may measure the quantity of curds by any suitable means, including by measuring either the depth or mass of curds on the belt. In the most preferred embodiment, the quantity sensor measures the depth of curds on the belt. The quantity sensor may be positioned anywhere on the housing, but preferably is positioned toward the downstream end of the housing, under the salt tube apparatuses. In the preferred embodiment, the quantity sensor is operably connected to the salt dispenser, and directs the salt dispenser to release an amount of salt appropriate for the quantity of curds being processed on the belt.

The salt dispenser comprises a chamber member and other components described herein. It is connected to and receives salt from a salt hopper, and it dispenses the salt into the tube apparatuses. A supply of salt is provided to the salt hopper. To ensure that the salt flows freely from the salt hopper into the chamber member, the salt hopper has steep sides and a bin vibrator is attached to the sides of the salt hopper. A chamber member is positioned under the salt hopper, and an air inlet is attached to the side of the chamber member. In a preferred embodiment, a plurality of salt hoppers are used, and the inlets for the chamber members are connected so that only one filter is required. In the most preferred embodiment, four salt hoppers are used. The middle end opening of a Venturi pickup tee is connected to the lower end of the chamber member. A pump attached to a first end opening of the Venturi pickup tee pushes air that has passed through a high-efficiency filter into the Venturi pickup tee.

Each tube apparatus consists of hollow tubes connected to a second end opening of the Venturi pickup tee. The tube apparatus's distribution ends are spaced over the food to be salted in a manner that ensures that the salt is applied uniformly to the food. In a preferred embodiment, each distribution end terminates in a duckbill-shaped portion, thus enhancing the even spreading of the salt. If the salt is being applied to food being processed on a conveyor belt, the duckbill ends ensure that the salt is spread evenly over the width of the belt.

A vertically oriented dispensing wheel is located inside the chamber member. The dispensing wheel has a plurality of openings. In its preferred embodiment, the dispensing wheel has a plurality of teeth separated by large gaps. When the wheel turns, salt is moved from the top portion of the chamber member to the bottom. The Venturi pickup tee creates a partial vacuum in the lower portion of the chamber member, thereby pulling the salt from the lower portion of the chamber member into the airstream. The salt is carried into the chamber member in air that enters the system through the makeup inlets on the chambers.

In the preferred embodiment of the invention, air is used to convey the salt. The pump will take the form of an air blower, and the fluid that enters the chamber members through the makeup inlets is air. Nevertheless, other fluids including water may be used to convey the salt in the present invention. It is contemplated that any source of suitable fluid will suffice to practice the present invention, and thus that the invention may be practiced without a pump when a fluid is used that is propelled by other forces, such as gravity or a municipal water supply.

Drive means are attached to the dispensing wheel. The drive means preferably is a motor with a direct current proportioner. In a preferred embodiment of the present invention, a quantity sensor measures the amount of food to be salted. The quantity sensor is operably connected to the drive means and varies the rate at which the wheel turns, thereby controlling the amount of salt dispensed to ensure that the proper proportion of salt is applied to the food being processed.

In the preferred embodiment of the invention, one tube apparatus will be provided for each salt hopper, with the tube apparatus connected to the salt hopper through the Venturi pickup tee, chamber member and other components described herein. However, any ratio of tube apparatuses to salt hoppers may be used in the practice of the invention. For example, it may be desirable in certain applications to have a plurality of salt hoppers for each tube apparatuses and it may be desirable in other applications to have a plurality of tube apparatuses for each salt hopper.

A primary object of the present invention is to provide a machine for processing a stirred curd cheese that is closed to the atmosphere and that easily may be cleaned. Another object of the invention is to produce cheese curds that have been drained properly of whey, have been salted, have achieved a proper acidity level, are uniformly mixed, and are of consistent size. Further objects of the invention are to provide for consistent salt distribution, proper temperature control, consistent moisture control, and less generation of cheese fines. It is yet another object of the present invention to reduce costs for labor, maintenance, and space requirements. A further object of the present invention is to provide a salting apparatus that evenly distributes salt over the food being processed, and that applies an amount of salt that is in proportion to the quantity of food being salted. Still another object of the present invention is to provide a salting apparatus that has only minimal moving parts.

These and other objects of the present invention will become apparent with reference to the drawings, the description of the preferred embodiment, and the appended claims.

BRIEF DESCRIPTION OF THE DRAWINGS

FIG. 2 depicts the arrangement of FIGS. 2A–C.

FIG. 3 depicts the arrangement of FIGS. 3A–C.

FIGS. 3A–3C are top views with some internal components shown in phantom.

FIG. 9 is a sectional front view of the salt dispenser.

FIG. 10 is a front elevational view of a curd sensor and of a tube apparatus mounted across the width of a conveyor belt.

FIG. 11 is a fragmentary sectional view taken along line 11—11 in FIG. 3A.

DETAILED DESCRIPTION OF THE PREFERRED EMBODIMENT

Figure 1:
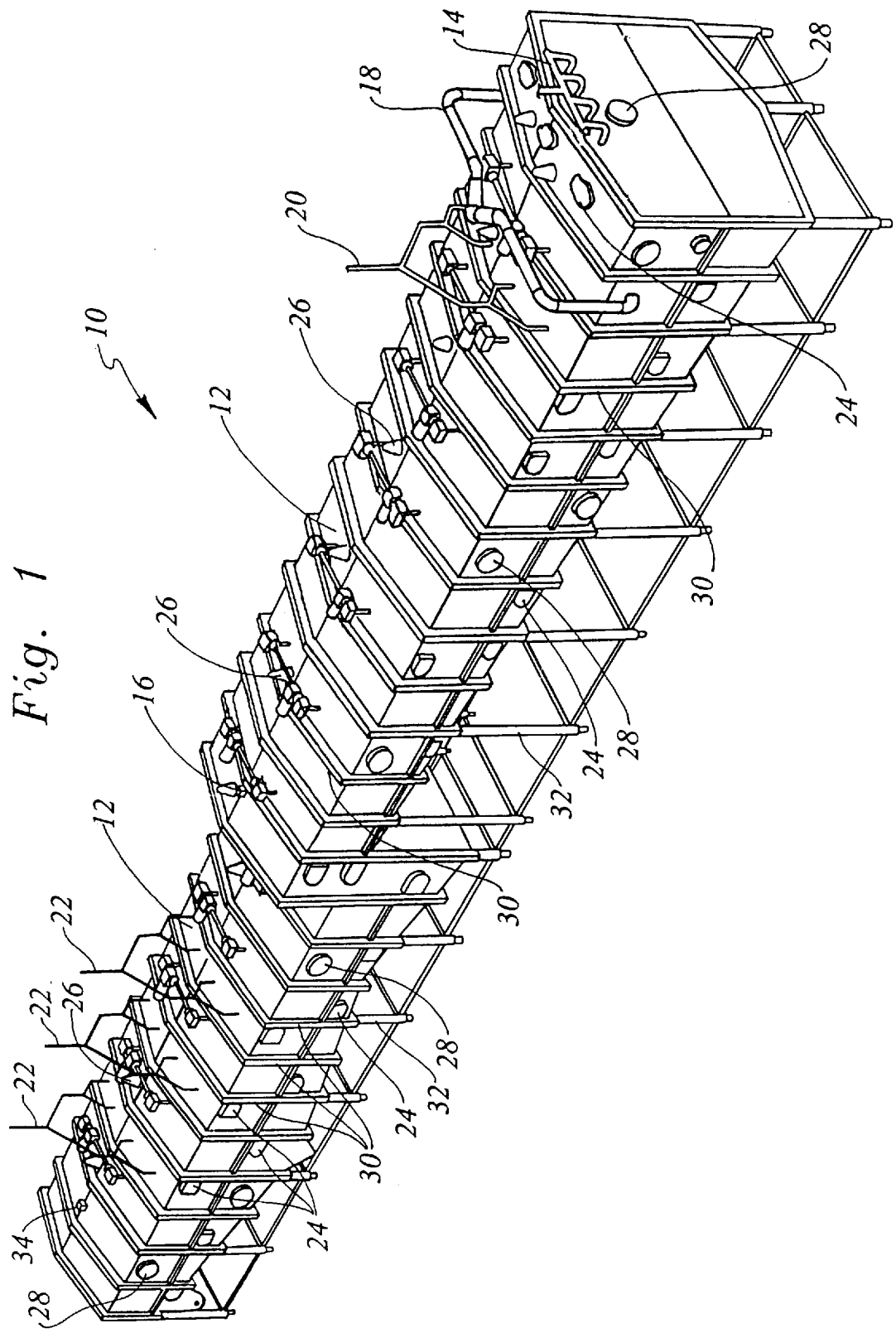
FIG. 1 is a perspective view of the present invention.

FIG. 1 depicts a food processing device 10 constructed in accordance with the present invention. The device 10 consists of an elongated housing 12. In the preferred embodiment, the housing is enclosed in order to control heat and moisture levels, keep out contaminants, and allow efficient internal mechanized cleaning. A curd and whey inlet 14 is attached to the front of the housing 12 to allow curds and whey to be dispensed into the device 10. A temperature sensor 16 is mounted midway along the housing 12 and is operably connected to ventilation ductwork 18, thereby controlling the amount of cool air that circulates into the device 10 to control the temperature of the curds. The temperature sensor 16 may be a side-mounted probe or, as shown in the preferred embodiment, a top-mounted infrared device.

A presalt tube apparatus 20 is connected on top of the housing 12 toward the upstream end of the device 10 to allow salt to be applied to the curds at the beginning of the processing. Salt tube apparatuses 22 are connected to the top of the housing 12 toward the downstream end of the device 10, thus allowing the product to be salted toward the downstream end of the processing. In the preferred embodiment, each salt tube apparatus 22 is identical to each other and to presalt tube apparatus 20. Accordingly, reference may be made herein simply to a tube apparatus 20, 22.

Inspection ports 24 and lights 26 mounted above sight-glasses (not shown) allow the user to view the processing taking place inside the device 10. Access ports 28 allow manual access to the inside of the device 10. The housing 12 has reinforcing ribs 30 and support legs with adjustable feet 32. A moisture sensor 34 is mounted on top of the device 10.

Figure 2A:
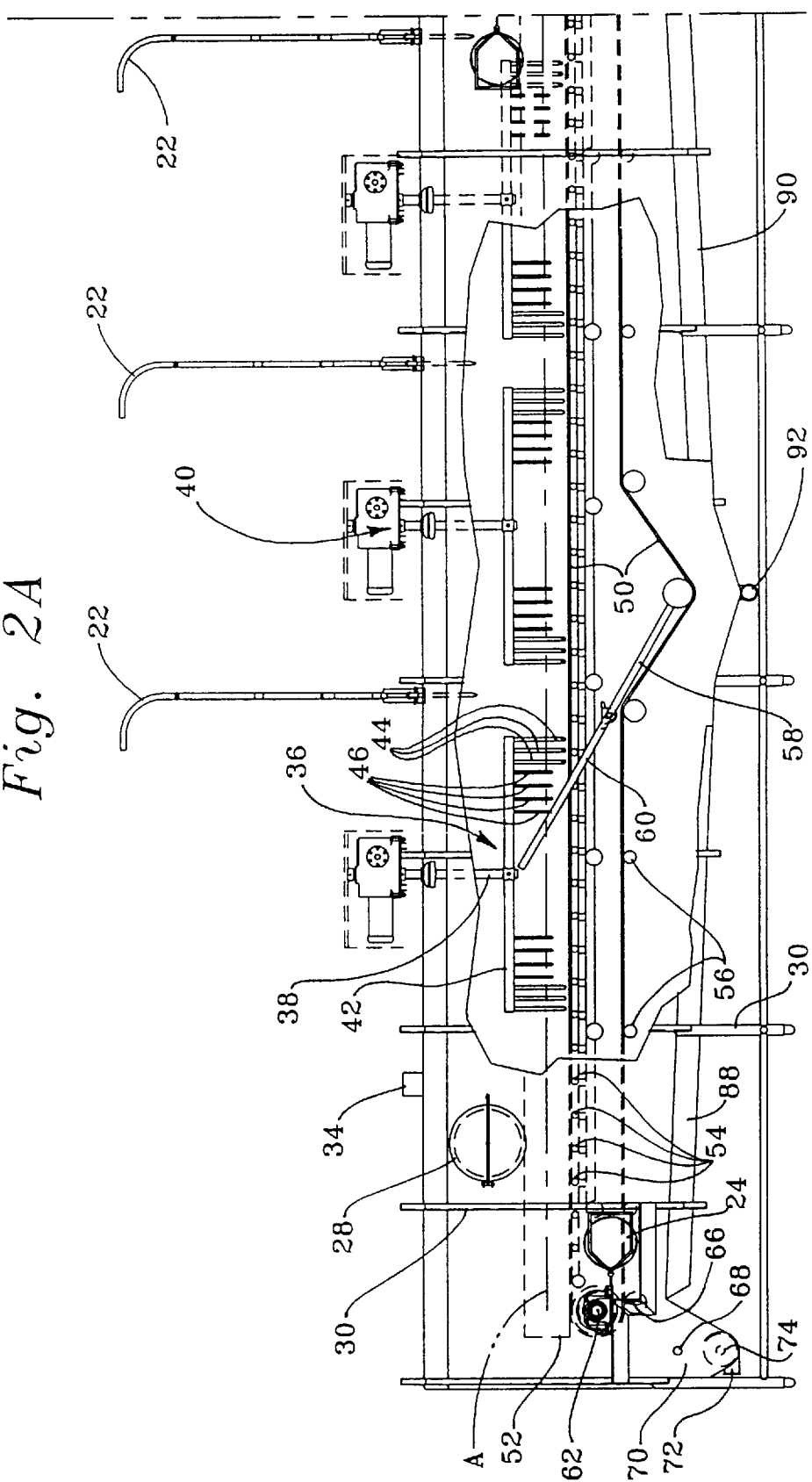
FIGS. 2A–C are side elevational views with parts cut away to show the interior of the food processing device.
Figure 2B:
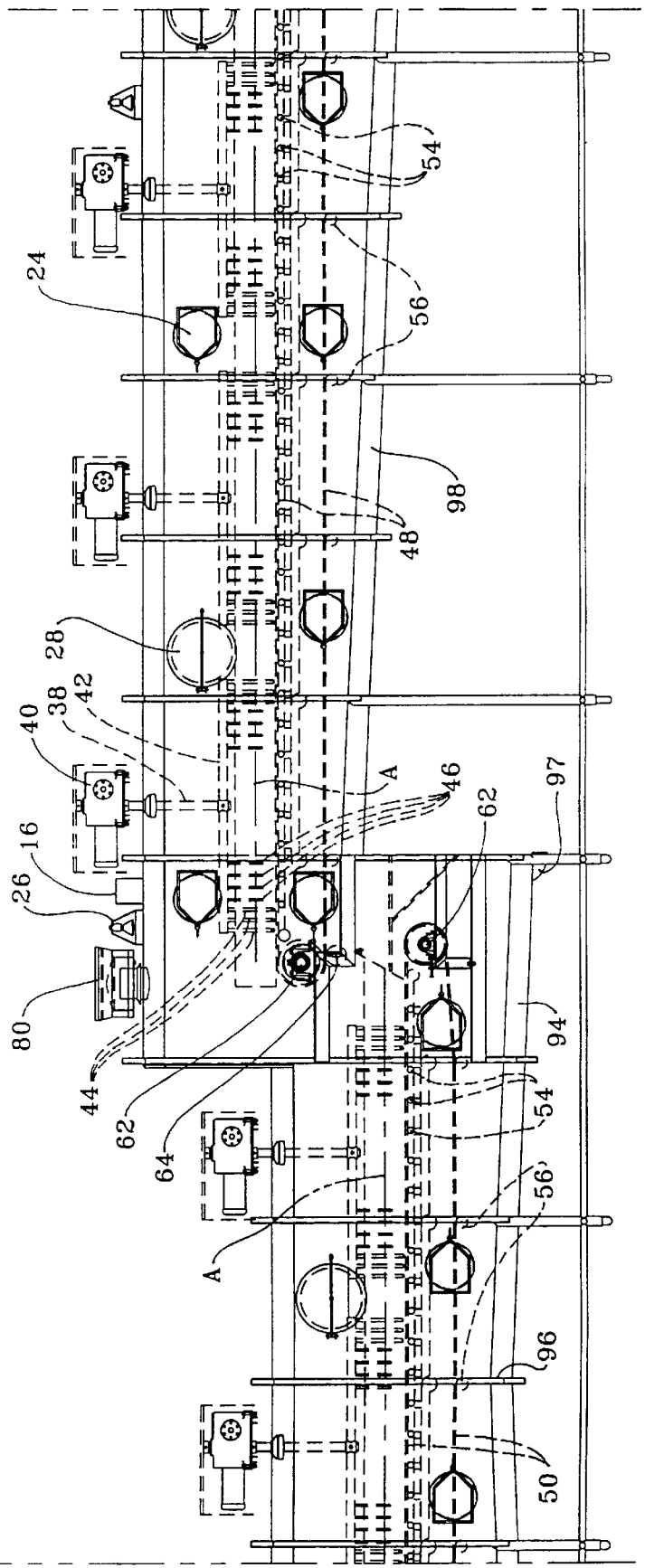
Figure 2C:
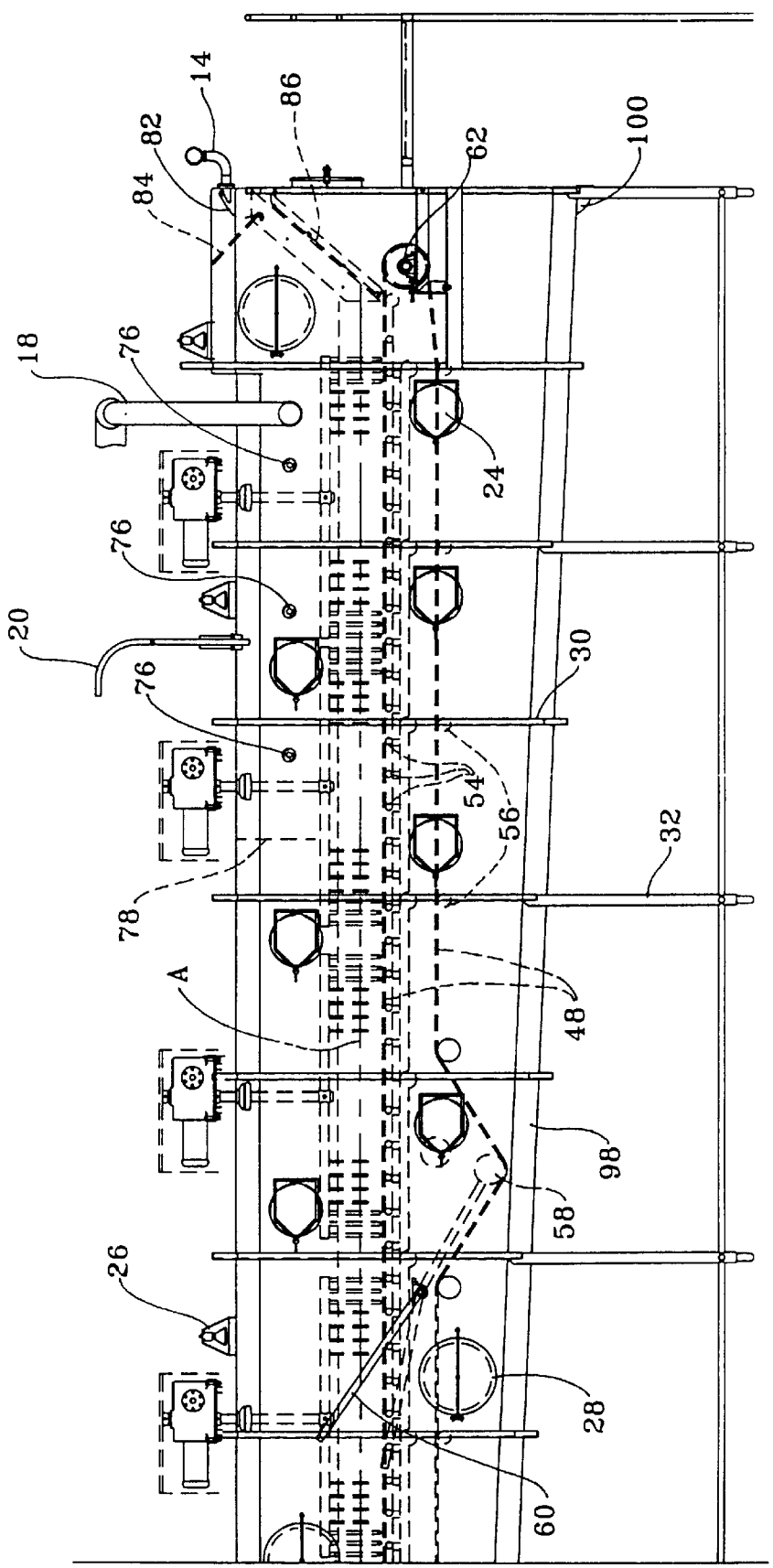

As shown in FIG. 2, each vertical agitator 36 is connected by a vertical shaft 38 to a final gear reduction box 40. A horizontal shaft 42 is attached to the bottom end of the vertical shaft 38, and forward prongs 44 and rearward prongs 46 are attached to the horizontal shaft. The forward prongs 44 are blunt. They are curved toward and located just above first conveyor belt 48 (the stirring belt) and second conveyor belt 50 (the salting belt). Line A represents the depth of the curds being processed on the belts 48, 50. The forward prongs 44 scoop the curds, while the rearward prongs 46 are dragged through and stir the curds. Sideboards 52, which are shown in phantom in FIG. 2, keep the curds on the conveyor belts 48, 50. The sideboards 52 are made of plastic or other easily cleaned, corrosion-resistant material.

Any number of conveyor belts may be used with the present invention. In its preferred embodiment, food processing device 10 uses two conveyor belts, first conveyor belt 48 and second conveyor belt 50. The conveyor belts 48, 50 are positioned in a step-wise, overlapping fashion to ensure that all material is transferred from the first conveyor belt 48 to the second conveyor belt 50 as the curds and whey move through the processing stages. Each conveyor belt 48, 50 allows the whey to be drained from the curds, travels along belt carryways 54 and belt returnways 56, is tensioned by a gravity belt takeup 58 and takeup release arm 60, and is mounted on belt drive and idler shafts 62.

A first belt scraper 64 is positioned at the second end (the downstream end) of first conveyor belt 48, and a second belt scraper 66 is positioned at the second end of second conveyor belt 50. The first belt scraper 64 and second belt scraper 66 ensure that the food is removed completely from the first conveyor belt 48 and the second conveyor belt 50. A photoeye 68, which senses curd accumulation in auger trough 70, is positioned at the second end of the second conveyor belt 50. Curds are collected in auger trough 70, and may be removed from the device 10 through curd outlet 72. A curd outlet auger 74 is located at the second end of the second conveyor belt 50 to aid in removing the processed curds. A moisture sensor 34 is positioned toward the second end of the second conveyor belt 50.

Curd wash headers 76 are located at the first end of the first conveyor belt 48. A curd wash curtain 78 contains the liquid used in the curd wash. Vents 80 are located at the second end of the first conveyor belt 48, midway along the top of the device 10. At the first end of the first conveyor belt 48, an inlet deflector plate 82 is located next to the curd and whey inlet 14. The first end of the inlet deflector plate 82 is pivotally mounted on top of the curd and whey inlet 14. The second end of the inlet deflector plate 82 is held in place by an inlet deflector plate arm 84. Located below the inlet deflector plate 82 is a draining screen 86. In the preferred embodiment, the draining screen 86 is a commercially available wedge wire dewheying screen.

A first ramp 88 and a second ramp 90 are located under that portion of the second conveyor belt 50 that is under the salt tube apparatuses 22. The first ramp 88 and the second ramp 90 slope toward a salty whey outlet 92, where whey is collected from the curds after they have been salted. The second ramp 90 meets a third ramp 94 at a peak 96. Sweet whey that falls on the third ramp 94 runs in the opposite direction from the salty whey collected on the second ramp 90, and is collected at a secondary sweet whey outlet 97. A fourth ramp 98 is positioned under the first conveyor belt 48 to collect the sweet whey drained from the curds on the first conveyor belt 48 at a main sweet whey outlet 100. Each of the ramps 88, 90, 94, 98 also is optimally positioned to ensure proper drainage of the cleaning and rinsing solutions that are used when the clean-in-place procedures for the device 10 are followed.

Figure 3B:
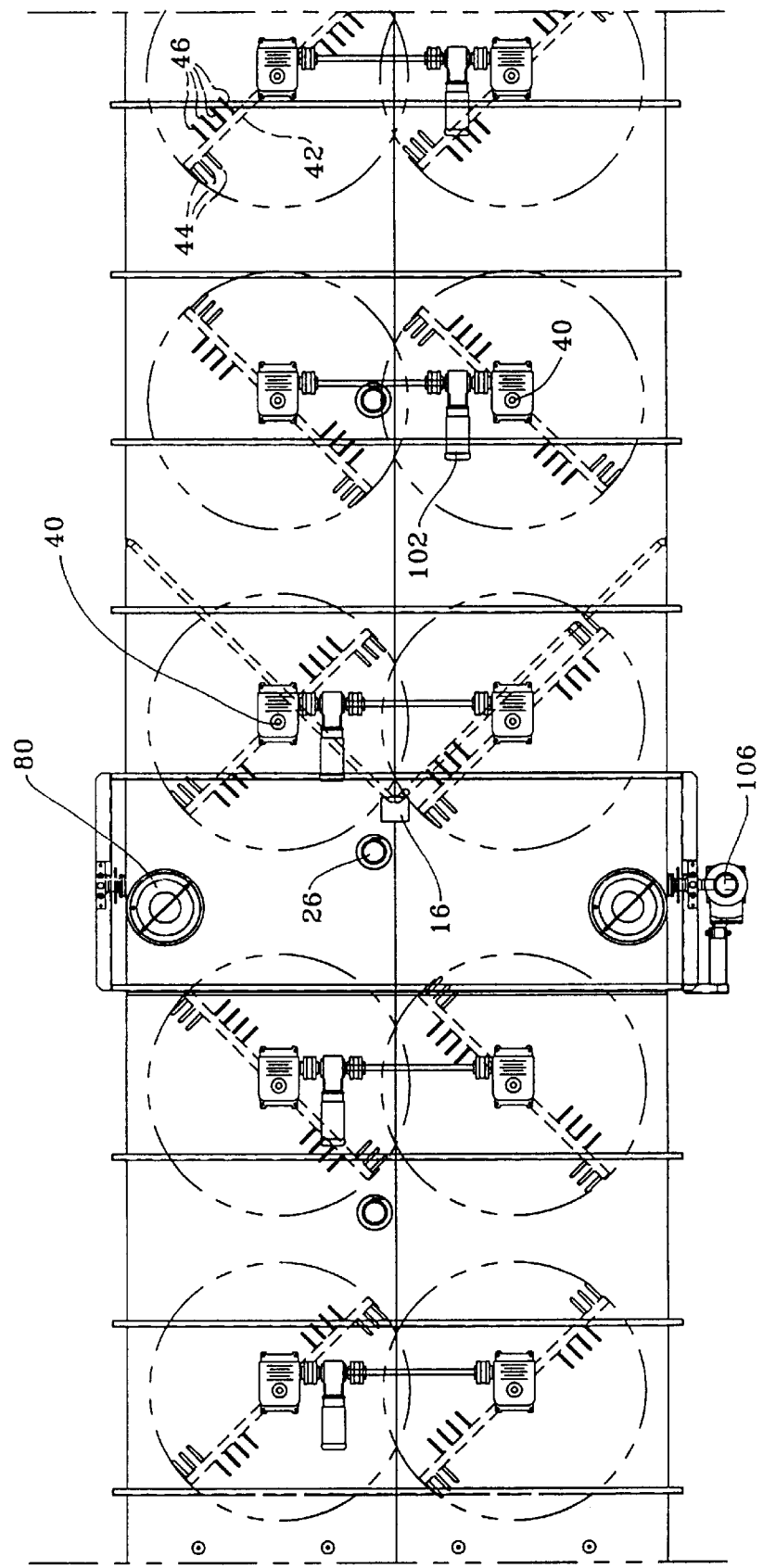
Figure 3C:
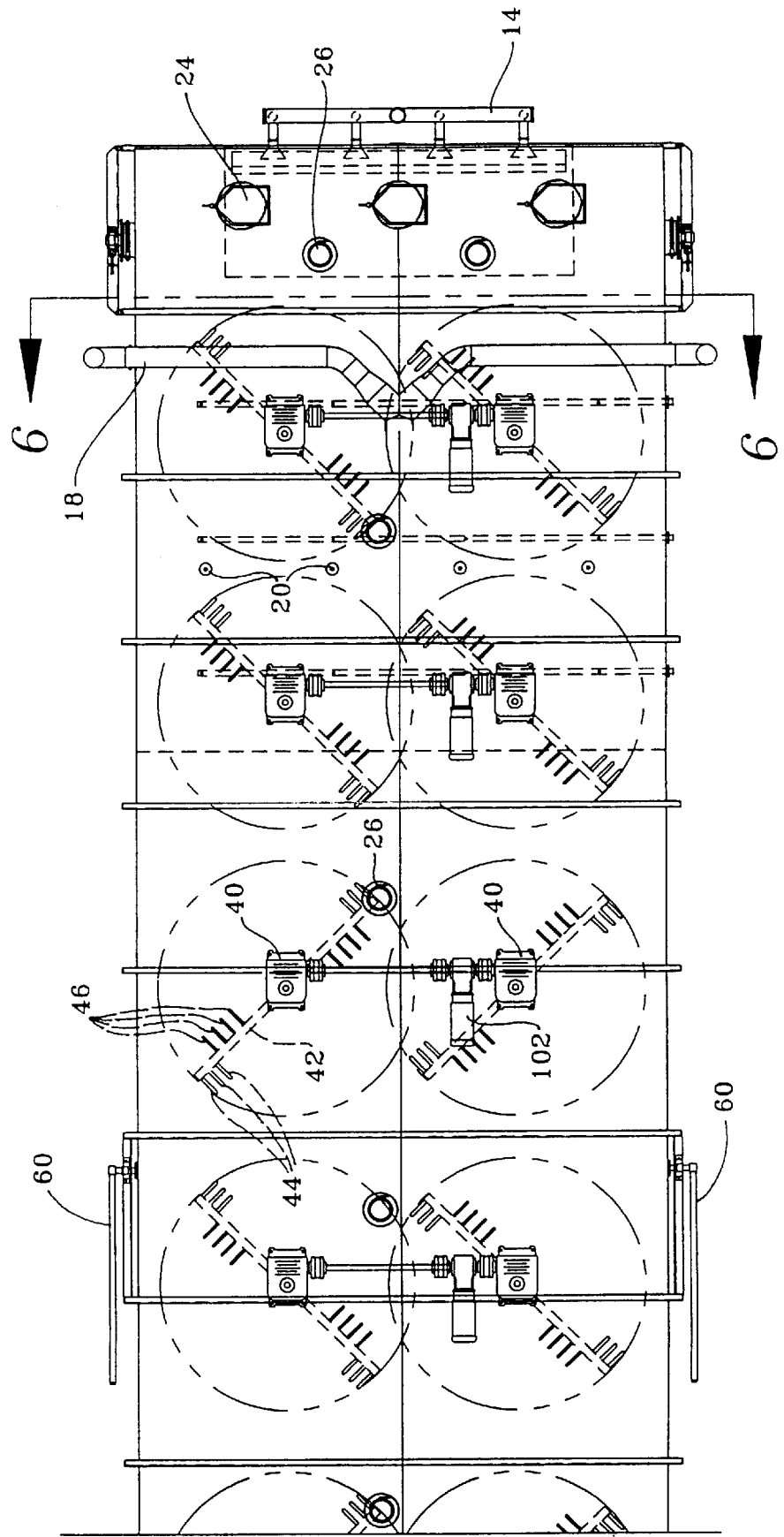

Referring now to FIG. 3, it can be seen that each pair of vertical agitators 36 is driven by a single motor and primary gear reduction box 102. Each motor and primary gear reduction box 102 is operably connected to two final gear reduction boxes 40, one above each of two vertical agitators 36. It can be seen that each of the two vertical agitators 36 that are rotated by the same motor and primary gear reduction box 102 rotate in opposite directions, and each overlaps the area swept by the other. Each final gear reduction box 40 drives a single vertical agitator 36 and is suited to withstand lateral stresses imposed by the vertical agitator 36.

As best seen in FIG. 3, in the preferred embodiment of the device 10 the vertical agitators are spaced closer together toward the front end of the device 10, where curds and whey are deposited on the first conveyor belt 48 by the curd and whey inlet 14. The curds cool as they move along the belts 48, 50, thus requiring less agitation from the vertical agitators 36. By increasing the spacing between vertical agitators 36 as the curds and whey proceed through the device 10, fewer vertical agitators 36 are required by the device 10, thereby reducing manufacturing and maintenance costs. The salting belt drive 104 drives the second conveyor belt 50, while the stirred curd belt drive 106 drives the first conveyor belt 48. The curd outlet auger drive 108 removes processed curds from the device 10.

Figure 4:
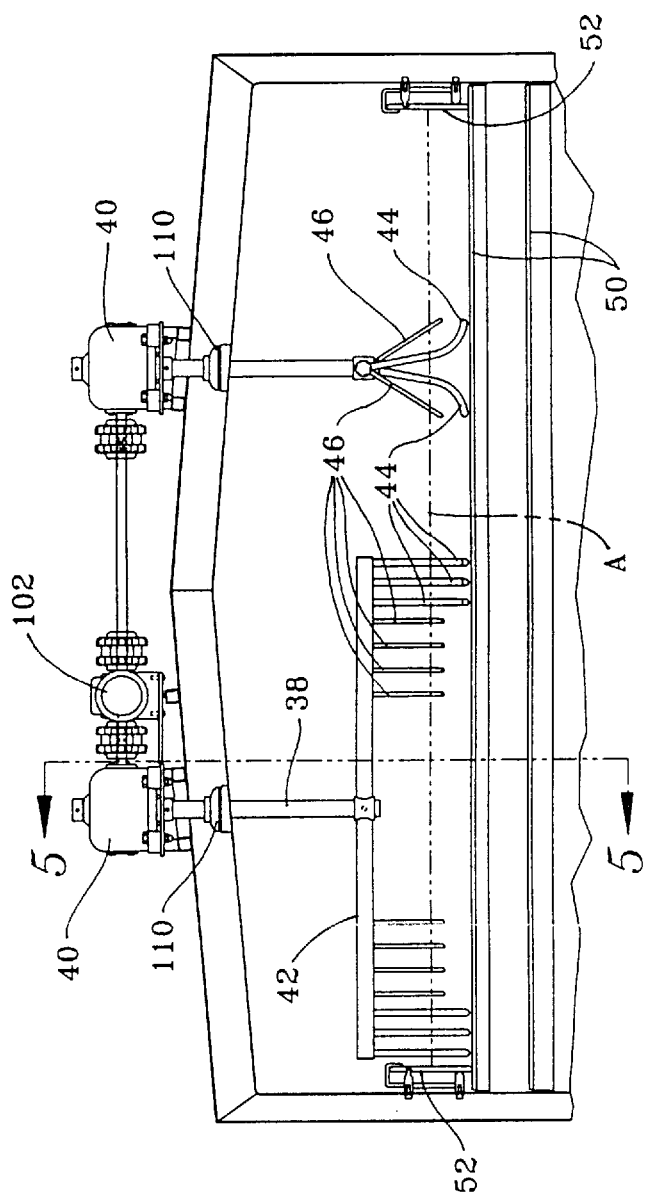
FIG. 4 is a fragmentary sectional view taken along line 4—4 in FIG. 3A.
Figure 5:
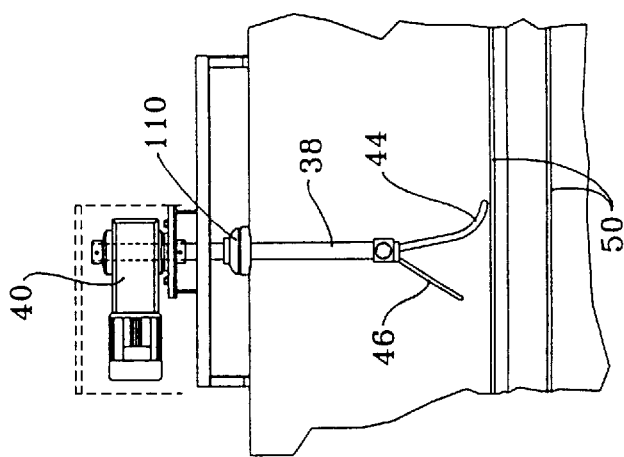
FIG. 5 is a fragmentary sectional view taken along line 5—5 in FIG. 4.

Referring now to FIGS. 4 and 5, a cross-sectional view of the device 10 is depicted. A sealed lip 110 is placed on each vertical shaft to prevent lubricating fluids from entering the housing 12 from the final gear reduction box 40. It can be seen in FIG. 4 that the paired horizontal shafts 42 are 90° out of phase, in that, when the horizontal shaft 42 of one vertical agitator 36 is parallel to the cross-section of the device 10, the horizontal shaft 42 of the other vertical agitator 36 is perpendicular to the cross-section of the device 10. The configuration of the forward prongs 44 and rearward prongs 46 on the horizontal shaft 42 most clearly can be seen in FIG. 5, which is a side view of only one end of the horizontal shaft 42. As depicted, the forward prongs 44 are moving to the right-hand side of the figure, thus scooping curds from the belt 50 without physically damaging them. The rearward prongs 46 are dragged through the curds, thus stirring the curds, also without causing physical damage.

Figure 6:
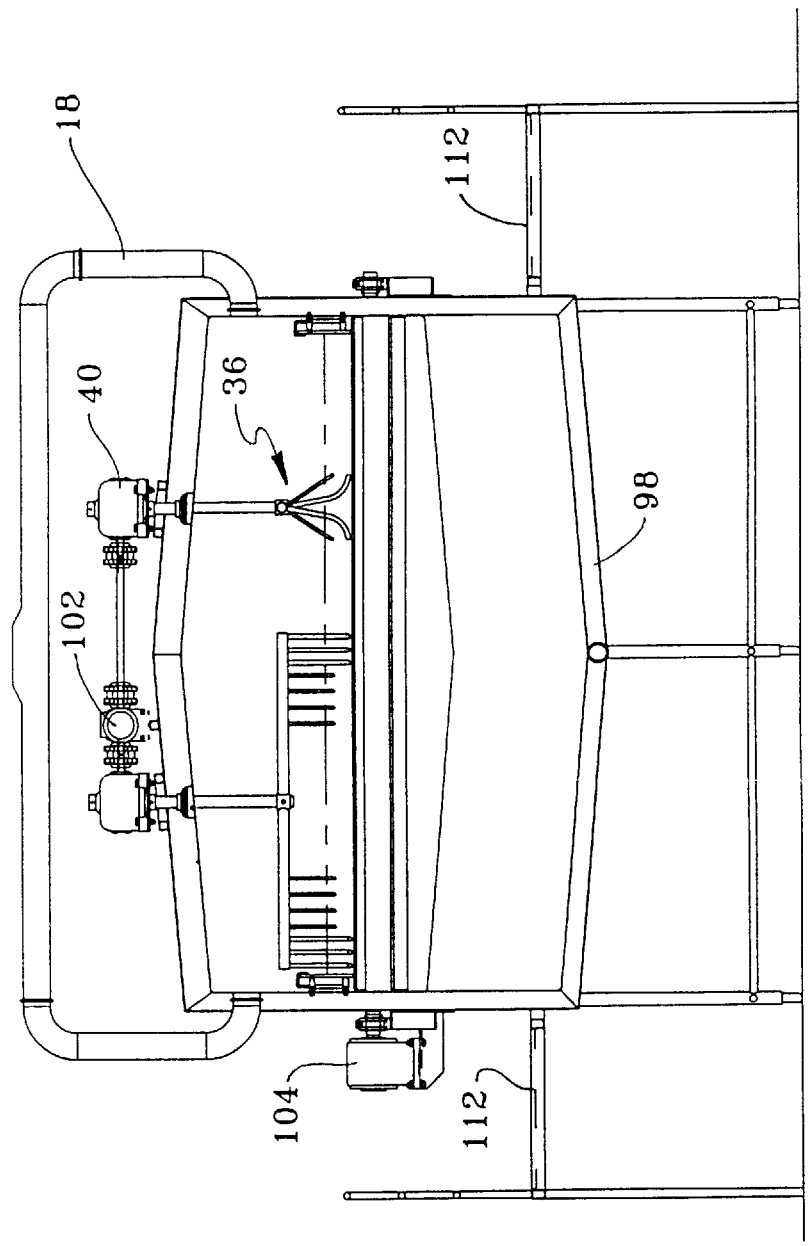
FIG. 6 is a fragmentary sectional view taken along line 6—6 in FIG. 3C.

Referring now to FIG. 6, a cross-sectional view of the device 10 is depicted. Next to the belt is a catwalk 112. Mounted on top of the housing 12 is the ventilation duct 18. FIG. 6 also depicts the interaction between the two vertical agitators 36.

Figure 7:
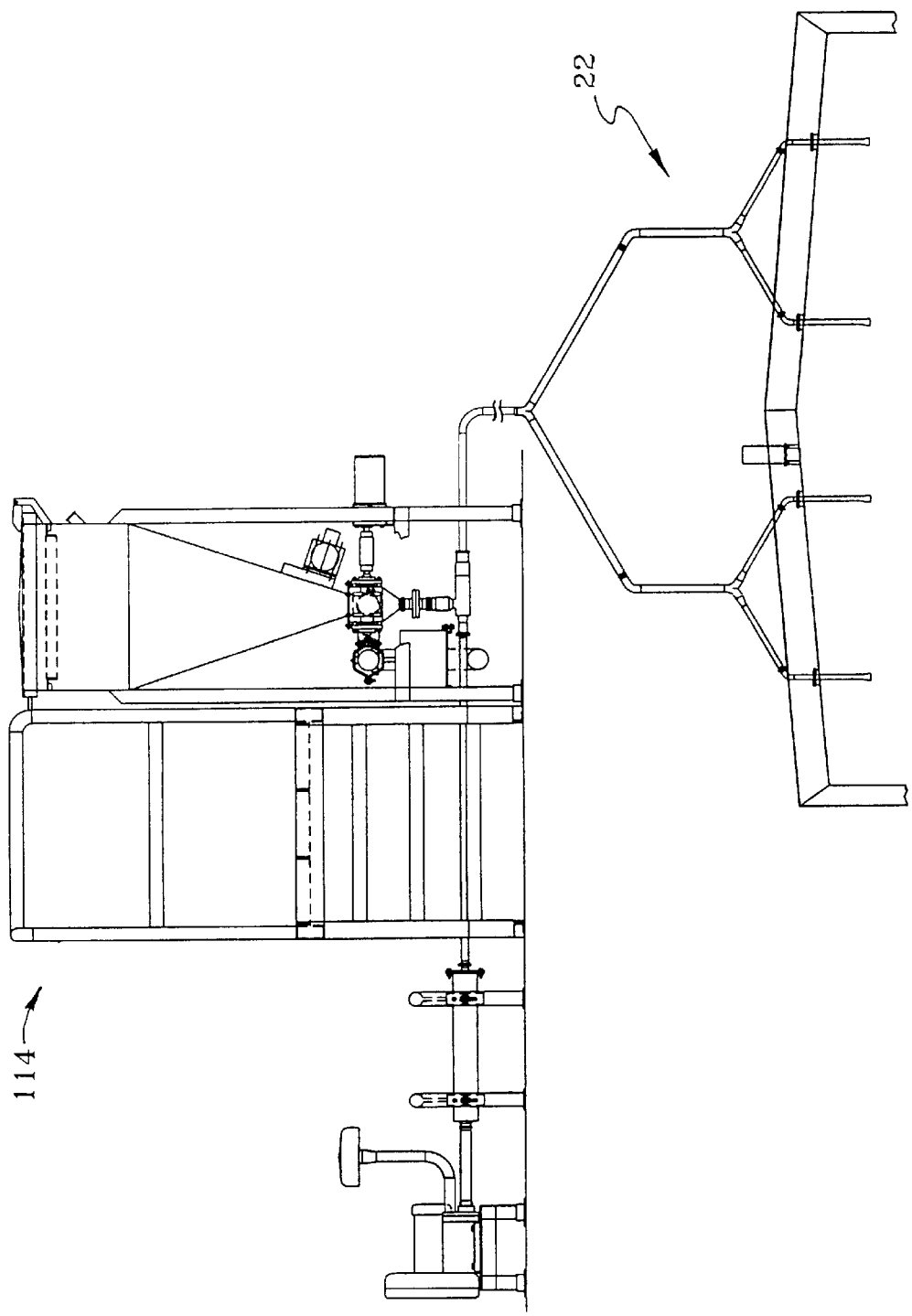
FIG. 7 is a elevational side view of the salt dispenser and a front elevational view of a tube apparatus.
Figure 8:
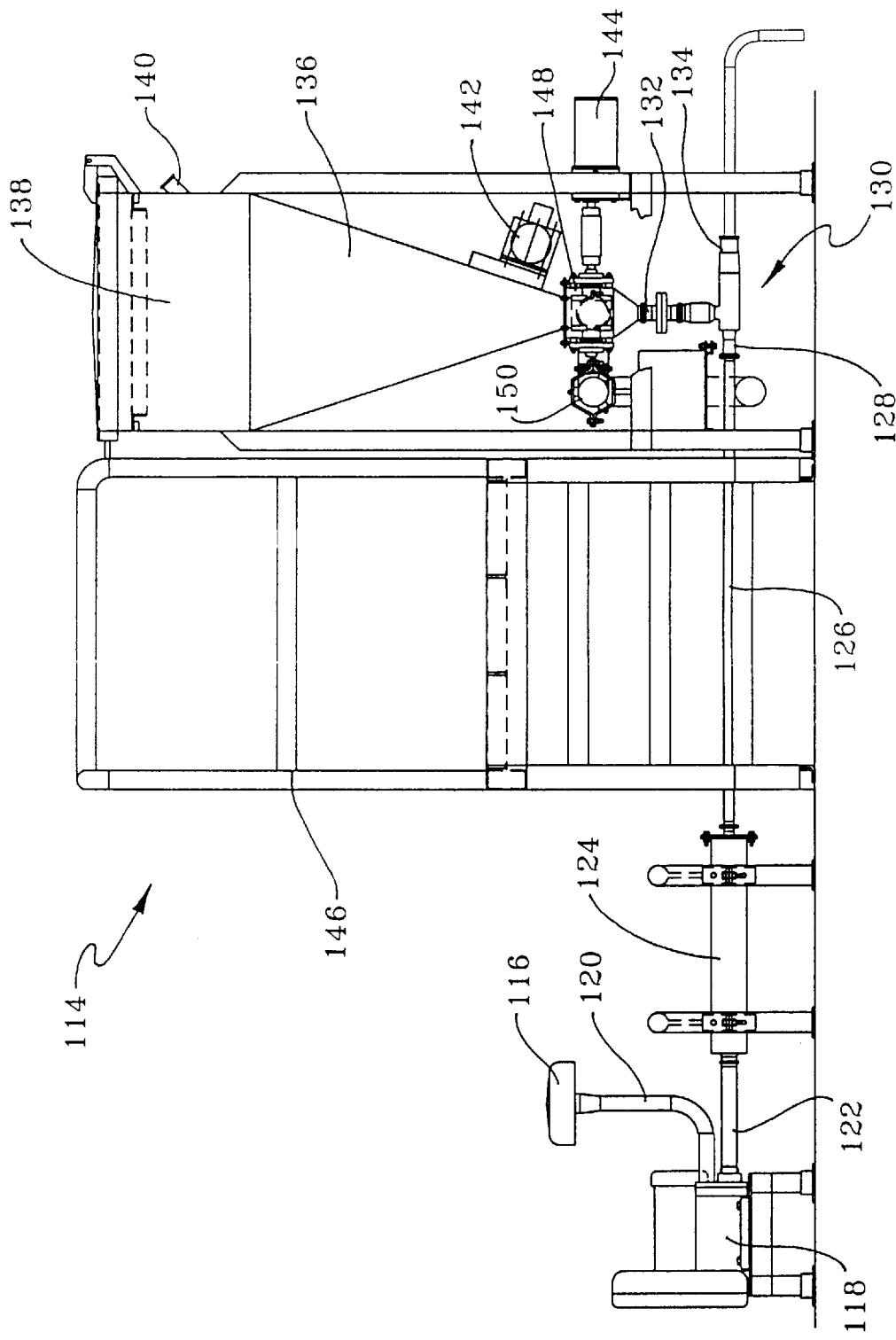
FIG. 8 is a elevational side view of the salt dispenser.

Referring now to FIG. 7, a salt dispenser 114 is connected to the tube apparatus 20, 22. As can be seen in FIG. 8, an inlet filter 116 is connected to a pump 118 by a first connecting tube 120. The pump 118 is connected by a second connecting tube 122 to a high-efficiency filter 124, which is connected by a third connecting tube 126 to the first end opening 128 of a Venturi pickup tee 130. The Venturi pickup tee 130 also has a middle end opening 132 and a second end opening 134. Although a Venturi pickup tee 130 is used in the preferred embodiment of the invention, it is contemplated that other means for connecting the salt supply to the airstream also would be suitable. Furthermore, although inlet filter 116 and high-efficiency filter 124 are desirable and are used in the preferred embodiment of the present invention, the use of such filters is not necessary to practice the invention. The connecting tubes 120, 122, 126 also may be eliminated by connecting the components directly to one another or by other means without affecting the practice of the invention.

A salt hopper 136 receives a supply of salt. In a preferred embodiment, the supply of salt is a polyhedral container capable of holding a quantity of salt therein. In the most preferred embodiment, the supply is a salt container 138 that is a generally rectangular solid directly coupled to the salt hoppers beneath it. If the supply is in the form of a salt container 138, a probe assembly 140 may be mounted on the side of the salt container 138. The probe assembly 140 has an element that detects when the salt level in the hopper has fallen too low. The probe assembly 140 also may have a second element that detects when the level of salt in the salt container 138 is at a maximum level. In an alternative embodiment, the probe assembly may be mounted directly on the side of the salt hopper 136.

The salt hopper 136 has steeply sloped sides to ensure the salt flows freely. In addition, a bin vibrator 142 is attached to the side of the salt hopper 136. Drive means 144 also are attached to the side of the salt hopper 136. A platform 146 is located adjacent to the salt hopper 136 to provide access to the salt hopper 136.

Referring now to FIG. 9, a chamber member 148 is mounted directly below the bottom of the salt hopper 136. The bottom of the chamber member is connected to the middle end opening 132 of the Venturi pickup tee 130. A makeup inlet 150 is attached to the side of the chamber member 148. In the preferred embodiment, where a plurality of salt hoppers 136 and thus a plurality of chamber members 148 are used, the makeup inlet 150 takes the form of a tube that connects each of the chamber members 148. Drive means 144 are operably connected to a dispensing wheel 152 located and vertically oriented within the chamber member 148. The dispensing wheel 152 has a plurality of large teeth 154, with large gaps 156 between the teeth 154. Air that enters the makeup inlet 150 first must pass through a makeup inlet filter 158.

Referring now to FIG. 10, the tube apparatus 20, 22 comprises hollow tubes 160. The top end of the tube apparatus 20, 22 is connected to the second end opening 134 of the Venturi pickup tee 130. In a preferred embodiment, the hollow tubes 160 have branches 162, so that the tube apparatus 20, 22 has one hollow tube 160 at its top end, and then has branches 162 that separate the single hollow tube 160 at the top end of the tube apparatus 20, 22 into a plurality of hollow tubes 160 at the bottom end of the tube apparatus 20, 22. Each branch 162 diverges at the same angle from the hollow tube 160, thereby ensuring that the salt is evenly dispensed at the branch 162. In a most preferred embodiment, each tube apparatus 20, 22 has a branch 162 that yields two hollow tubes 160, each of which again has a branch 162 that yields two more hollow tubes 160, thereby making a total of four distribution ends 164 for each tube apparatus 20, 22.

Each distribution end 164 terminates in a duckbill-shaped portion 166, thereby spreading the salt over a wide area. In the preferred embodiment, a quantity sensor 168 is positioned above the food to be processed on the conveyor belt 50. The quantity sensor 168 determines the quantity of the food on the conveyor belt 50 to be salted and is operably connected to the drive means 144, thereby ensuring that the amount of salt dispensed into the tube apparatus 20, 22 is in proportion to the quantity of food being processed.

FIG. 11 depicts a cross-sectional view of the device 10. Vertical agitators 36, as well as the motor and primary gear reduction box 102 and final gear reduction boxes 40 that drive them, have been removed for clarity. When a plurality of tube apparatuses 22 are used, in the preferred embodiment of the invention they are staggered to ensure uniform coverage over the width of the belt 50. Nevertheless, it is contemplated that the invention may be practiced by arranging the tube apparatuses 22 in any suitable manner. A quantity sensor 168 is mounted above the curds to detect the quantity of the curds passing beneath the salt tube apparatuses 22.

As shown in FIG. 11, various cleaning nozzles are located within the housing 12. Spray balls 170 are mounted from the top of the housing 12 along the length of the device 10 in order to clean the inside of the device 10. Spray bars 172 are located along the length of the device 10 on the inside of the belts 48, 50. Each spray bar spans the width of the device 10, and thus is well-suited to clean the belts 48, 50. A spray ball 170 and a spray bar 172 are depicted in FIG. 11, but have been omitted from the other figures to enhance clarity.

The operation of the device 10 now will be described. A mixture of curds and whey is pumped from a processing vat through the curd and whey inlet 14 into the food processing device 10. The inlet deflector plate 82 spreads the curd and whey mixture so that it is distributed evenly onto the draining screen 86. The inlet deflector plate 82 may be adjusted so that its distance from the curd and whey inlet 14 is directly proportional to the rate at which the curds and whey are being introduced into the device 10. The position of the inlet deflector plate 82 is maintained by the inlet deflector plate arm 84. The draining screen 86 drains a substantial portion of the whey from the curd and whey mixture. The whey runs onto the fourth ramp 98 and is collected at the main sweet whey outlet 100.

The curds and remaining whey travel along the first conveyor belt 48, where they are subject to a curd wash from the curd wash headers 76 and a the presalt from presalt tube apparatus 20. Additional whey and the curd wash liquid, in addition to whey extruded from the curds when the presalt causes the curds to contract, runs onto the fourth ramp 98 and is collected at the main sweet whey outlet 100.

As the curds travel along the first conveyor belt 48, they are stirred by vertical agitators 36. Forward prongs 44 scoop while stirring, thereby avoiding physical damage to the curds and ensuring that the curds are processed into a uniform size. Rearward prongs 46 further stir the curds, also without physically damaging them. A temperature sensor 16 is mounted at the end of first conveyor belt 48 and operably connected to means for forcing cool air through the ventilation ductwork 18, thereby automatically ensuring that the curds are processed at the proper temperature.

The conveyor belts 48, 50 may be operated at speeds from approximately 0.333 feet per minute (fpm) to approximately 2 fpm, with a preferred rate of speed of approximately 1 fpm. The vertical agitators 36 may be operated from approximately 7.5 rotations per minute (rpm) to approximately 30 rpm, with a preferred rate of 15 rpm.

Upon reaching the end of the first conveyor belt 48, the curds and whey are deposited on the second conveyor belt 50. A first belt scraper 64 ensures that all curds and whey are removed from the first conveyor belt 48 and deposited on the second conveyor belt 50.

Vertical agitators 36 continue to stir the curds as they travel along the second conveyor belt 50. Whey that is drained from the curds toward the first end of the second conveyor belt 50 runs onto the third ramp 94 and is collected at the secondary sweet whey outlet 97. After passing over the peak 96, salt is applied to the curds by a plurality of salt tube apparatuses 22. The salting causes further contraction of the curds, thus forcing out more whey. Whey that is separated from the curds after the curds pass the peak 96 runs onto the first ramp 88 and the second ramp 90 and is collected at the salty whey outlet 92.

The moisture sensor 34 detects the moisture content of the curds near the end of the processing in the device 10. Adjustments thus may be made promptly if the curd moisture levels are not within the proper tolerances. Upon reaching the second end of the second conveyor belt 50, the fully processed curds are deposited into the auger trough 70. The second belt scraper 66 ensures that the processed curds are removed from the second conveyor belt 50. The processed curds may be removed from the device 10 through the curd outlet 72 with the aid of the curd outlet auger 74. In the event the curds begin accumulating in the auger trough 70, when they reach the height of the photoeye 68, the photoeye 68 will detect the accumulation and stop the device 10.

While the curds are travelling through the device 10, salt is flowing from the salt container 138 into the salt hopper 136, which deposits the salt into the upper portion of the chamber member 148 and onto the dispensing wheel 152. The salt fills the gaps 156 between the teeth 154 of the dispensing wheel 152. As the dispensing wheel 152 is turned by the drive means 144, the salt is moved from above to below the dispensing wheel 152, where it then leaves the chamber member 148 and enters the middle end opening 132 of the Venturi pickup tee 130. The quantity sensor 168 measures the quantity of food being processed on the belt and sends a signal to the drive means 144, thus operating the drive means 144 faster as the quantity of food being processed on the conveyor belt 50 increases.

At the same time, pump 118 pulls air through inlet filter 116, and then forces the air through the high-efficiency filter 124. The air then enters the Venturi pickup tee 130 through its first end opening 128, and leaves through its second end opening 134. As the air passes through the Venturi pickup tee 130, it creates a partial vacuum in the middle end opening 132 and in the chamber member 148. This partial vacuum sucks the salt into the middle end opening 132 of the Venturi pickup tee 130, where it then is conveyed in the airstream out the second end opening 134 of the Venturi pickup tee 130. A stream of air is provided to convey the salt from the bottom of the chamber member 148 into the middle end opening 132 of the Venturi pickup tee 130. This airstream enters the chamber member 148 through makeup inlet 150 after being passed through makeup inlet filter 158.

After passing through the second end opening 134 of the Venturi pickup tee 130, the salt is conveyed into the hollow tubes 160 of the tube apparatus 20, 22. The salt is distributed evenly over the branches 162 and passes to the distribution ends 164, where it is spread by the duckbill-shaped portions 166 over the food being processed on the conveyor belt 48, 50.

Although the description of the preferred embodiment has been presented, it is contemplated that various changes may be made without deviating from the spirit of the present invention. Accordingly, it is intended that the scope of the present invention be dictated by the appended claims, rather than by the description of the preferred embodiment.

We claim:

1. A salting apparatus for salting food in a food processor, the apparatus comprising:
    a salt receptacle;
    a salt dispenser operably connected to the salt receptacle;
    a pump;
    a stationary tube apparatus having top and bottom ends; and
    a connector to connect the pump with the dispenser and the tube apparatus, wherein the pump provides the connector with pressurized air for conveying salt from the dispenser through the bottom end of the stationary tube apparatus onto the food.

2. The salting apparatus of claim 1, wherein said connector comprises a Venturi pickup tee having first and second end openings and a middle end opening, said first end opening being connected to said pump, said second end opening being connected to said top end of said tube apparatus, and said middle end opening being connected to said salt dispenser.

3. The salting apparatus of claim 2, further comprising a quantity sensor operably connected to said salt dispenser, thereby enabling said dispenser to dispense salt in proportion to the quantity of food to be salted.

4. The salting apparatus of claims 2 or 3, wherein said salt dispenser comprises:
    a chamber member having sides and top and bottom ends, said top end being operably connected to said salt receptacle, and said bottom end being operably connected to said middle end opening of said Venturi pickup tee; and
    a salt transmission mechanism operably positioned within said chamber member to deliver salt from said top of said chamber member to said bottom of said chamber member.

5. The salting apparatus of claim 4, wherein a makeup inlet is positioned on said side of said chamber member.

6. The salting apparatus of claim 5, wherein said salt transmission mechanism comprises a salt dispensing member positioned within said chamber member and a driver to drive said salt dispensing member.

7. The salting apparatus of claim 6, wherein said salt dispensing member is a vertically oriented wheel having a plurality of openings.

8. The salting apparatus of claim 6, wherein said driver is a motor.

9. The salting apparatus of claim 8, wherein a direct current proportioner is operably connected to said motor.

10. The salting apparatus of claims 1, 2, or 3, wherein said salt receptacle comprises a salt hopper having sloped sides.

11. The salting apparatus of claim 10, further comprising a salt container connected to said salt hopper.

12. The salting apparatus of claim 10, further comprising a probe assembly connected to said salt hopper for monitoring the amount of salt in said salt hopper.

13. The salting apparatus of claim 11, further comprising a probe assembly connected to said salt container for monitoring the amount of salt in said salt container.

14. The salting apparatus of claims 1, 2, or 3, further comprising an inlet filter operably connected to said pump.

15. The salting apparatus of claim 14, further comprising a high-efficiency filter operably connected to said pump.

16. The salting apparatus of claims 1, 2, or 3, wherein said bottom end of said tube apparatus is positioned proximate to the food to be salted.

17. The salting apparatus of claim 16, wherein said bottom end of said tube apparatus has at least one duckbill-shaped portion.

18. The salting apparatus of claim 16, wherein said bottom end of said tube apparatus comprises a plurality of distribution ends.

19. The salting apparatus of claim 18, wherein each of said distribution ends has a duckbill-shaped portion.

20. The salting apparatus of claim 16, wherein said bottom end of said tube apparatus comprises a plurality of branched distribution tubes.

21. A salt distribution apparatus for distributing salt to food that is being conveyed, the apparatus comprising:
    a salt receptacle;
    a salt dispenser operably connected to the salt receptacle; and
    a stationary tube apparatus operably connected to the salt dispenser to receive salt therefrom and to distribute said salt directly onto the conveyed food from the stationary tube apparatus.

22. The salt distribution apparatus of claim 21, wherein said tube apparatus includes a bottom end that is positioned adjacent to the food to be salted.

23. The salt distribution apparatus of claim 22, wherein said bottom end of said tube apparatus has at least one duckbill-shaped portion.

24. The salt distribution apparatus of claim 23, wherein said bottom end of said tube apparatus comprises a plurality of distribution ends.

25. The salt distribution apparatus of claim 24, wherein each of said distribution ends has a duckbill-shaped portion.

26. A salt distribution apparatus for distributing salt to food that is being conveyed, the apparatus comprising:
    a salt receptacle;
    a salt dispenser operably connected to the salt receptacle;
    a first stationary tube apparatus operably connected to the salt dispenser to receive salt therefrom and to distribute said salt to the conveyed food; and
    a second stationary tube apparatus operably connected to a second salt dispenser and staggered from the first stationary tube apparatus along the conveyed food for distributing salt thereupon.

* * * * *